United States Patent
Perktold et al.

(10) Patent No.: US 12,508,656 B2
(45) Date of Patent: Dec. 30, 2025

(54) MACHINING TOOL AND METHOD FOR INDEXING A CUTTING INSERT

(71) Applicant: CERATIZIT AUSTRIA GESELLSCHAFT M.B.H., Reutte (AT)

(72) Inventors: Helmut Perktold, Reutte (AT); Peter Hohlrieder, Reutte (AT); Ronald Huber, Reutte (AT)

(73) Assignee: Ceratizit Austria GmbH, Reutte (AT)

( * ) Notice: Subject to any disclaimer, the term of this patent is extended or adjusted under 35 U.S.C. 154(b) by 604 days.

(21) Appl. No.: 17/916,196

(22) PCT Filed: Mar. 17, 2021

(86) PCT No.: PCT/EP2021/056765
§ 371 (c)(1),
(2) Date: Sep. 30, 2022

(87) PCT Pub. No.: WO2021/197846
PCT Pub. Date: Oct. 7, 2021

(65) Prior Publication Data
US 2023/0150037 A1 May 18, 2023

(30) Foreign Application Priority Data
Mar. 31, 2020 (EP) .................................... 20166931

(51) Int. Cl.
B23B 27/16 (2006.01)
(52) U.S. Cl.
CPC ...... B23B 27/1666 (2013.01); B23B 27/1681 (2013.01); *B23B 2205/04* (2013.01); *B23B 2205/12* (2013.01)
(58) Field of Classification Search
CPC ............ B23B 27/1681; B23B 2205/04; B23B 2260/106; B23B 2205/12; B23B 27/1666;
(Continued)

(56) References Cited

U.S. PATENT DOCUMENTS 2,598,581 A * 5/1952 Mckenna ............ B23B 27/1662
407/104
3,059,316 A * 10/1962 Berry, Jr. ................ B23B 27/16
407/101
(Continued)

FOREIGN PATENT DOCUMENTS

CN 201394660 Y 2/2010
EP 1197281 A1 4/2002
(Continued)

OTHER PUBLICATIONS

Tao Honglong et al., General Textbook for Mechanical Engineering in Technical Schools, Engineering Technology, Oct. 1980, China Machinery Industry Press, China.

*Primary Examiner* — Sara Addisu
(74) *Attorney, Agent, or Firm* — Laurence A. Greenberg; Werner H. Stemer; Ralph E. Locher (57) ABSTRACT

A machining tool includes a tool carrier with at least one seat receiving an exchangeable, indexable cutting insert. A fastening screw fastening cutting insert to seat has a head section for support on the cutting insert and a shaft section at least regionally having an external screw thread. The seat has a contact face supporting an underside of the cutting insert and at least one lateral bearing face supporting a side surface of the cutting insert. A through-hole is formed in the contact face, through which the shaft portion of the fastening screw extends. A clamping element is disposed on the tool carrier on the rear side of the contact face of the seat, in which an internal screw thread is formed, cooperating with the external screw thread of the fastening screw. The fastening screw and the clamping element can be jointly displaced in a displacement direction.

9 Claims, 8 Drawing Sheets

(58) Field of Classification Search
CPC ........ B23B 2200/3627; B23B 27/1662; B23B 5/12
See application file for complete search history.

(56) References Cited

U.S. PATENT DOCUMENTS

| | | | | |
|---|---|---|---|---|
| 3,289,272 A * | 12/1966 | Stier | ................... | B23B 27/1662 407/104 |
| 3,299,489 A * | 1/1967 | Pohle | ................... | B23B 27/1614 407/104 |
| 3,341,923 A * | 9/1967 | Kelm | ................... | B23B 27/1662 407/104 |
| 3,488,822 A * | 1/1970 | Jones | ................... | B23B 27/1662 407/105 |
| 3,525,136 A * | 8/1970 | Crosby | ................... | B23B 27/1662 407/101 |
| 3,648,341 A * | 3/1972 | Viellet | ................... | B23B 27/1662 407/104 |
| 3,787,941 A * | 1/1974 | Novkov | ................... | B23B 27/1622 407/113 |
| 3,965,553 A * | 6/1976 | Faber | ................... | B23B 27/1662 407/104 |
| 3,996,651 A * | 12/1976 | Heaton | ................... | B23B 27/1662 407/104 |
| 4,050,127 A | 9/1977 | Bodem et al. | | |
| 4,204,781 A * | 5/1980 | Johann | ................... | B23B 27/1662 407/105 |
| 4,283,163 A * | 8/1981 | Grafe | ................... | B23B 27/1662 407/104 |
| 4,398,853 A * | 8/1983 | Erickson | ................... | B23B 27/1622 407/104 |
| 4,427,322 A * | 1/1984 | Kroll | ................... | B23B 27/1662 407/105 |
| 4,615,650 A * | 10/1986 | Hunt | ................... | B23B 27/1622 407/105 |
| 4,875,812 A * | 10/1989 | Haque | ................... | B23B 27/1622 407/104 |
| 4,938,639 A * | 7/1990 | Lockard | ................... | B23B 27/167 407/103 |
| 5,102,268 A * | 4/1992 | Mitchell | ................... | B23C 5/2226 407/46 |
| 5,167,473 A * | 12/1992 | Barnett | ................... | B23B 27/1662 407/85 |
| 5,256,008 A * | 10/1993 | Hansson | ................... | B23B 29/04 407/113 |
| 6,158,928 A * | 12/2000 | Hecht | ................... | B23B 27/1622 407/103 |
| 6,190,095 B1 | 2/2001 | Schmidt | | |
| 7,261,495 B1 * | 8/2007 | Nelson | ................... | B23B 27/1662 407/104 |
| 7,322,777 B2 * | 1/2008 | Jager | ................... | B23B 27/1655 408/179 |
| 9,862,040 B2 * | 1/2018 | Kocherovsky | ........ | B23C 5/2472 |
| 10,131,005 B2 * | 11/2018 | Waggle | ................... | B23C 5/2475 |
| 10,307,832 B2 * | 6/2019 | Harif | ................... | B23B 27/1662 |
| 10,384,271 B2 * | 8/2019 | Rumpf | ................... | B23B 27/164 |
| 11,541,463 B2 * | 1/2023 | Kato | ................... | B23B 27/1662 |
| 2005/0047882 A1 | 3/2005 | Karlsson et al. | | |
| 2011/0188951 A1* | 8/2011 | Mergenthaler | ............ | B23C 5/24 407/44 |
| 2015/0217384 A1* | 8/2015 | Saji | ................... | B23C 5/24 407/93 |
| 2018/0015549 A1* | 1/2018 | Harif | ................... | B23B 27/1662 |
| 2019/0054542 A1 | 2/2019 | Huber et al. | | |

FOREIGN PATENT DOCUMENTS

| | | |
|---|---|---|
| JP | S5974002 U | 5/1984 |
| JP | S61144902 U | 9/1986 |
| JP | H11197904 A | 7/1999 |
| JP | 2001246516 A | 9/2001 |
| RU | 83757 U1 | 6/2009 |
| SU | 837573 A1 | 6/1981 |
| WO | 2017143368 A1 | 8/2017 |

\* cited by examiner

MACHINING TOOL AND METHOD FOR INDEXING A CUTTING INSERT

FIELD AND BACKGROUND OF THE INVENTION

The present invention relates to a machining tool and to a method for indexing a cutting insert.

SUMMARY OF THE INVENTION

In the case of machining of, in particular, metallic materials, machining tools are frequently used, in the case of which the blades which come into engagement with the material to be machined are configured on exchangeable cutting inserts which are made from a hard and wear-resistant material such as, in particular, hard metal (cemented carbide), cermet or a cutting ceramic and are fastened releasably to a tool carrier which is formed from a tougher material such as, for example, from tool steel. Here, the cutting inserts are frequently configured as what are known as indexable cutting inserts which have a plurality of individually usable blades which can be used successfully one after another when the respective previous one is worn. Here, the blades are usually arranged in such a way that the cutting insert has a certain symmetry, with the result that the indexing or further switching to move the next blade into an active position takes place by way of a rotation of the cutting insert by a predefined angular range about an axis of symmetry of the cutting insert.

WO 2017/143368 A1 describes a cutting insert for bar peeling with a polygonal basic shape, in the case of which a total of six blades which can be used one after another are configured at a transition from an upper side to side faces, with the result that indexing of further switching to a following blade can take place by way of a rotation by 60° (=360°/6) about an axis of symmetry. The described cutting insert is configured for receiving on a seat in a bar peeling cartridge as tool carrier, the fastening taking place via a fastening screw, the head section of which is supported on the cutting insert and the shank section of which is provided with an external thread which interacts with the internal thread of a threaded bore in the seat of the bar peeling cartridge. In order to index the cutting insert, the fastening screw is removed completely, the cutting insert is rotated by 60° in the seat, and the shank section of the fastening screw is subsequently guided again through the through hole in the cutting insert and its external thread is screwed into the internal thread of the threaded bore.

It is an object of the present invention to provide an improved machining tool and an improved method for indexing a cutting insert, which, in particular, make simpler and more time-saving indexing possible.

The object is achieved by way of a machining tool as described below. Advantageous developments are specified in the dependent claims.

The machining tool has a tool carrier, on which at least one seat for receiving an exchangeable, indexable cutting insert is configured, and a fastening screw for fastening the cutting insert to the seat, which fastening screw has a head section for supporting on the cutting insert and a shank section which is provided at least in regions with an external thread. The seat has a contact face for supporting an underside of the cutting insert, and at least one lateral bearing face for supporting a side face of the cutting insert. A through hole is configured in the contact face, through which through hole the shank section of the fastening screw reaches. A clamping element is arranged on the tool carrier on the rear side of the contact face of the seat, in which clamping element an internal thread which interacts with the external thread of the fastening screw is configured. The fastening screw and the clamping element can be displaced jointly in a displacement direction.

Since the clamping element is provided, with which the fastening screw interacts, and the fastening screw and the clamping element can be displaced jointly in the displacement direction, the side face of the cutting insert can be removed from the lateral bearing face by way of slight releasing of the screw connection and by way of displacing of the fastening screw and the clamping element jointly with the cutting insert which is held by way of the fastening screw, with the result that the cutting insert can be indexed by way of rotation about the screw axis of the fastening screw, without the fastening screw needing to be removed completely. Therefore, the indexing can take place in a very simple and rapid way, and the cutting insert is secured against falling out during indexing. Here, the slight releasing of the screw connection requires only a relatively small rotation of the fastening screw about its screw axis. The underside of the cutting insert can be supported, for example, directly on the contact face or, for example, also indirectly via a washer which is arranged between the underside of the cutting insert and the contact face. The lateral bearing face can preferably extend perpendicularly with respect to the contact face.

In accordance with one development, the tool carrier has, furthermore, a stop which limits the joint displacement of the fastening screw and the clamping element. In this case, particularly simple handling is made possible, in the case of which the displacement can be reduced to the extent which is necessary for the indexing. The stop can be formed, for example, by way of a side of the through hole which limits the movement of the fastening screw, or by way of a bounding wall of a recess, in which the clamping element is received and which limits the movement of the clamping element.

In accordance with one development, the displacement direction has a directional component perpendicularly with respect to the lateral bearing face. In this case, the cutting insert can be removed from the lateral bearing face sufficiently by way of a small displacement, with the result that indexing is made possible. In addition, the displacement direction can also have a directional component parallel to the lateral bearing face.

In accordance with one development, the seat has at least one further lateral bearing face for supporting a further side face of the cutting insert. In this case, the cutting insert can be held in a particularly reliable manner on the seat even with a form-locking component, with the result that unintentional loosening of the screw connection between the fastening screw and the clamping element as a result of forces which occur during machining is counteracted. Here, the further lateral bearing face preferably extends in a plane which is different than the plane, in which the first lateral bearing face extends. The further lateral bearing face can preferably extend perpendicularly with respect to the contact face.

In accordance with one development, the displacement direction has a directional component perpendicularly with respect to the further lateral bearing face. In this case, the cutting insert can also be removed sufficiently from the further lateral bearing face by way of a small displacement, with the result that indexing is made possible.

If the lateral bearing face and the further lateral bearing face enclose a seat-side interior angle ($\alpha$)<90° as viewed perpendicularly with respect to the contact face, the cutting insert is held particularly reliably on the seat even with a form-locking component.

In accordance with one development, the through hole is configured as a slot with an elongate cross-sectional shape, and the longitudinal axis of the elongate cross-sectional shape runs in the displacement direction. In this case, the reduction in the active contact area caused by way of the through hole is kept small. Furthermore, in this case, the displacement direction can be defined by way of the shape of the through hole. Different cross-sectional shapes of the slot are possible such as, for example, substantially rectangular, with a rectangular basic shape with curved short sides, etc.

In accordance with one development, the clamping element is received in a rear-side recess of the tool carrier. In this case, the displacement direction and also the extent of the enabled displacement can be defined in a simple way by way of the shape of the recess. Furthermore, the securing of the clamping element against rotation in the case of the actuation of the fastening screw can also be brought about in a simple way by way of the shape of the recess. The clamping element is preferably held in the recess such that it cannot be rotated and can be displaced in the displacement direction.

In accordance with one development, the machining tool is a bar peeling cartridge for bar peeling. Here, the machining tool can preferably have at least two seats for receiving exchangeable cutting inserts.

In accordance with one development, the machining tool has an exchangeable, indexable cutting insert which is arranged on the seat.

If the cutting insert has a through hole which has a smaller cross section than the head section of the fastening screw, the cutting insert is secured particularly reliably against falling out during indexing.

The object is also achieved by way of a method for indexing a cutting insert as described below. Advantageous developments are specified in the dependent claims.

This is a method for indexing a cutting insert on a seat of a machining tool, the machining tool having a fastening screw for fastening the cutting insert to the seat, which fastening screw has a head section for supporting on the cutting insert and a shank section which is provided at least in regions with an external thread, the seat having a contact face for supporting an underside of the cutting insert and at least one lateral bearing face for supporting a side face of the cutting insert, the shank section of the fastening screw engaging through a through hole in the contact face, and the external thread interacting with an internal thread in a clamping element which is arranged displaceably on the rear side of the contact face. The method has the steps:

loosening of the threaded connection between the external thread of the fastening screw and the internal thread of the clamping element, without releasing the fastening screw completely from the clamping element;

joint displacing of the fastening screw, the clamping element, and an exchangeable, indexable cutting insert which is held by way of the fastening screw along a displacement direction, with the result that the cutting insert does not bear with a side face against the lateral bearing face;

indexing of the cutting insert by way of rotation of the cutting insert about the screw axis of the fastening screw by a predefined angular range;

joint displacing of the fastening screw, the clamping element and the cutting insert toward the lateral bearing face, with the result that the cutting insert bears with a side face against the lateral bearing face; and tightening of the threaded connection between the external thread of the fastening screw and the internal thread of the clamping element, with the result that the cutting insert is clamped fixedly on the seat.

By way of the loosening of the threaded connection, the common displacing, indexing and again joint displacing of the fastening screw, the clamping element and the cutting insert until the cutting insert bears with a side face against the lateral bearing face, this cutting insert can be indexed in a particularly simple and rapid way, in order to move the next cutting edge section into an active position after the wear of one cutting edge section. Here, the cutting insert remains secured against falling out even during indexing.

In accordance with one development, the common displacing takes place in a displacement direction which has a directional component perpendicularly with respect to the lateral bearing face. In this case, only a small displacement distance is required, in order to make the indexing possible.

In accordance with one development, the clamping element is held such that it cannot rotate on the machining tool. This can be brought about, for example, by way of form-locking receiving of the clamping element in a recess in the machining tool. Particularly simple and comfortable indexing is made possible by way of the non-rotational arrangement.

In accordance with one development, the fastening screw and the clamping element are guided, during the common displacing, in the machining tool in a displacement direction through the through hole and/or a recess for the clamping element. This can be achieved, for example, by way of a configuration of the through hole as a slot or by way of a shape of the recess in such a way that the clamping element is guided therein in a rail-like manner. In this case, the indexing can take place in a particularly comfortable way.

Further advantages and expediencies of the invention result on the basis of the following description of exemplary embodiments with references to the appended figures.

DETAILED DESCRIPTION OF THE INVENTION

First Embodiment

A first embodiment of the machining tool will be described in the following text with reference to FIG. 1 to FIG. 8.

Figure 1:
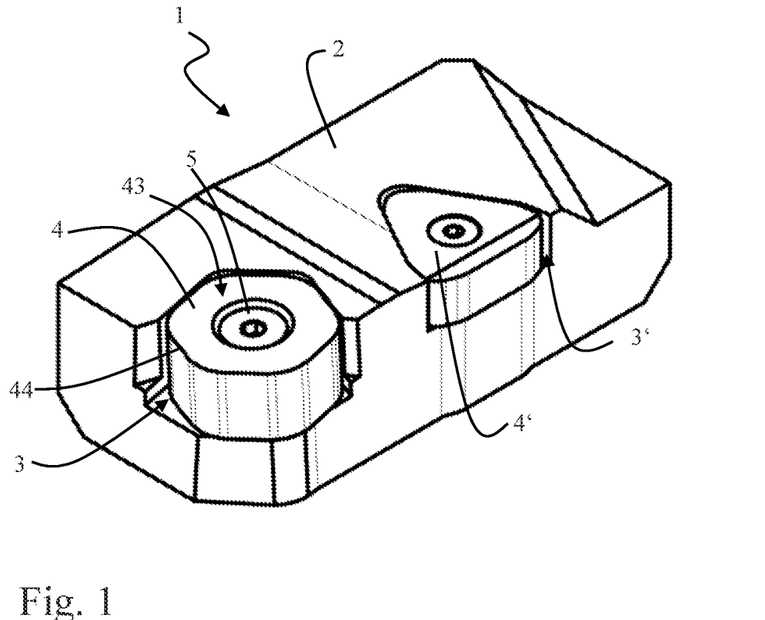
FIG. 1 shows a diagrammatic perspective illustration of a machining tool in accordance with a first embodiment.

In the case of the first embodiment, the machining tool 1 is configured as a bar peeling cartridge for bar peeling. In the case of bar peeling, a surface layer is removed by machining from a substantially cylindrical workpiece, as a result of which the workpiece obtains a smaller diameter. Here, a relative movement takes place between the workpiece and the machining tool 1 about the longitudinal axis of the workpiece. For example, the workpiece can rotate about its longitudinal axis, and the machining tool 1 is moved with a predefined cutting depth in the radial direction and with a predefined advance in the axial direction along the longitudinal axis of the workpiece, or the workpiece is moved along its longitudinal axis with a predefined advance relative to the machining tool 1, without rotating about its longitudinal axis, and the machining tool 1 is moved with a predefined cutting depth in the radial direction on a circular path about the longitudinal axis of the workpiece. Here, in the case of bar peeling, a plurality of machining tools 1 of this type can also be used at the same time distributed over the circumference of the workpiece to be machined.

The machining tool 1 has a tool carrier 2, on which, in the case of the first embodiment, a total of two seats 3, 3' for receiving exchangeable, indexable cutting inserts 4, 4' are configured. The tool carrier 2 can be configured, for example, from steel.

In the case of the example which is shown specifically in FIG. 1 to FIG. 8, a first cutting insert 4 of the exchangeable, indexable cutting inserts 4, 4' is designed for roughing of the workpiece, and the second cutting insert 4' is designed for subsequent finishing of the workpiece surface which is produced by way of the first cutting insert 4. During use, as a consequence, the relative movement between the machining tool 1 and the workpiece to be machined takes place in such a way that the second cutting insert 4' runs behind the first cutting insert 4 with regard to the advancing direction. Here, in the case of the exemplary embodiment, the first cutting insert 4 has a preferably substantially hexagonal basic shape. Other basic shapes, in particular polygonal ones, are also possible, however. The second cutting insert 4' has a substantially triangular basic shape. Other basic shapes are also possible for the second cutting insert 4', however.

In the following text, merely the region of the first seat 3 and the cutting insert 4 arranged thereon will be described in greater detail with reference to FIG. 2 to FIG. 8.

As can be seen, in particular, in FIG. 1, FIG. 2, FIG. 7 and FIG. 8, the cutting insert 4 has an upper side 43, a lower side 40 and a plurality of side faces which extend between the upper side 43 and the lower side 40 and of which a first side face 41 and a further side face 42 are labeled using designations by way of example in the figures. Here, a cutting edge 44 is configured at least at the transition from the upper side 43 to the side faces, which cutting edge 44 has a plurality of cutting edge sections 45 which can be moved into an active machining position one after another by way of indexing or further switching, of which cutting edge sections 45 one is labeled by way of example in FIG. 7. In the case of the example which is shown specifically in the figures of a substantially hexagonal basic shape of the cutting insert 4, a total of six cutting edge sections 45 which can be used one after another are configured at the transition from the upper side 43 to the side faces. In particular, for example, in the case of a different basic shape of the cutting insert 4, more than six or fewer than six cutting edge sections 45 which can be used one after another can be provided, however. The cutting insert has a through hole 46 which extends from the upper side 43 to the lower side 40.

The cutting insert 4 can be configured, for example, as a single-sided cutting insert, in the case of which a cutting edge 44 is configured only at the transition from the upper side 43 to the side faces. It can also be configured, however, as a double-sided cutting insert, for example, in the case of which a further cutting-edge is also configured at the transition from the lower side 40 to the side faces.

The seat 3 on the tool carrier 2 will be described in the following text in greater detail with reference to FIG. 3.

Figure 3:
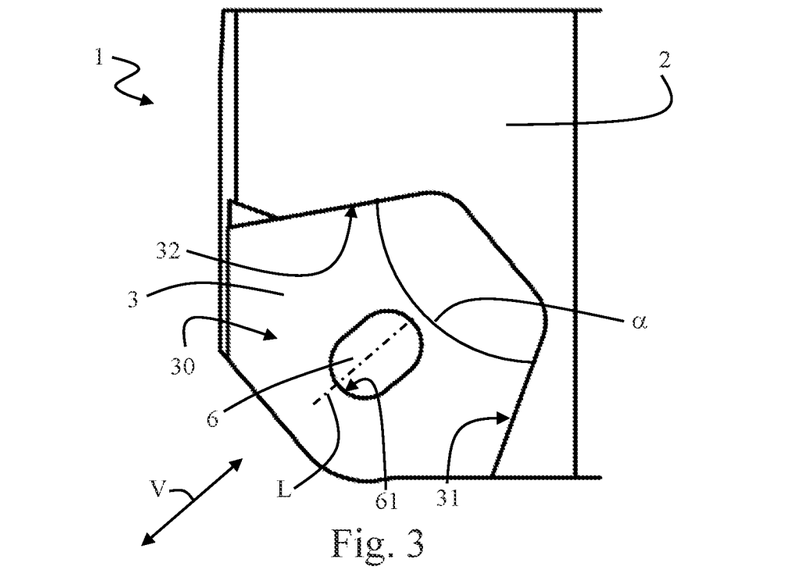
FIG. 3 shows a diagrammatic partial illustration in the region of the seat in a plan view without a cutting insert.

As can be seen in FIG. 3, the seat 3 has a contact face 30 which is configured for supporting the lower side 40 of the cutting insert 4. Here, the contact face 30 extends at least predominantly in one plane and, for direct, immediate support of the lower side 40, can be configured in such a way that it makes direct contact with this lower side 40. However, it is also possible, for example, that a washer is also arranged between the lower side 40 of the cutting insert 4 and the contact face 30, via which washer the lower side 40 is supported indirectly on the contact face 30.

Furthermore, the seat 3 has a lateral bearing face 31 for supporting a side face 41 of the cutting insert 4, as can likewise be seen in FIG. 3. Here, the lateral bearing face 31 can preferably extend in a plane perpendicularly with respect to the contact face 30 of the seat 3. The seat 3 also has a further lateral bearing face 32 for supporting a further side face 42 of the cutting insert 4. The further lateral bearing face 32 can likewise preferably extend in a plane perpendicularly with respect to the contact face 30 of the seat 3. As an alternative to this, for example, it is also possible that the lateral bearing face 31 extends at an angle which is different than 90° relative to the contact face 30, for example for the case where the side faces of the cutting insert do not run perpendicularly with respect to the lower side. In this case, the further lateral bearing face 32 can preferably also extend at the same angle which is different than 90° relative to the contact face 30.

As can be seen in FIG. 3, the lateral bearing face 31 and the further lateral bearing face 32 enclose a seat-side interior angle α with one another as viewed perpendicularly with respect to the contact face 30, which interior angle α is smaller than 90°. In the case of the embodiment which is shown specifically in the figures and in the case of which the cutting insert 4 has a substantially hexagonal basic shape, the interior angle α can be, for example, approximately 60°. For the case where the lateral bearing face 31 and the further lateral bearing face 32 do not extend perpendicularly with respect to the contact face 30, the interior angle α is to be measured in a plane, parallel to the contact face 30, between the lateral bearing face 31 and the further lateral bearing face 32.

As can likewise be seen in FIG. 3, in particular, a through hole 6 is configured in the contact face 30 of the seat 3, which through hole 6 extends from the contact face 30 as far as a rear side, facing away from the contact face 30, of the tool carrier 2. In the case of the specifically shown exemplary embodiment, the through hole 6 is configured as a slot with an elongate cross-sectional shape. The elongate cross-sectional shape has a longitudinal axis L in a plane parallel to the contact face 30.

Figure 2:
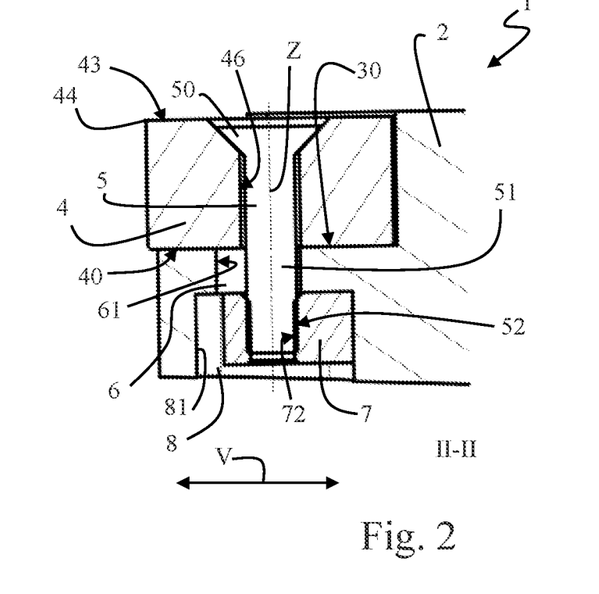
FIG. 2 shows a diagrammatic sectional illustration of the machining tool in the region of a seat for an exchangeable, indexable cutting insert in accordance with the section along the line II-II in the following FIG. 5, but with a fastening screw.

Furthermore, a fastening screw 5 is provided to fasten the cutting insert 4 securely to the seat 3. The fastening screw 5 extends along a screw axis Z and has a head section 50 for supporting on the cutting insert 4 and a shank section 51 which extends along the screw axis Z starting from the head section 50, as can be seen in FIG. 2, in particular. The shank section 51 is provided with an external thread 52 at least at its end which faces away from the head section 50. The head section 50 of the fastening screw 5 has a greater cross section in the direction perpendicularly with respect to a longitudinal axis of the fastening screw 5 than the through hole 46 in the cutting insert 4.

Figure 4:
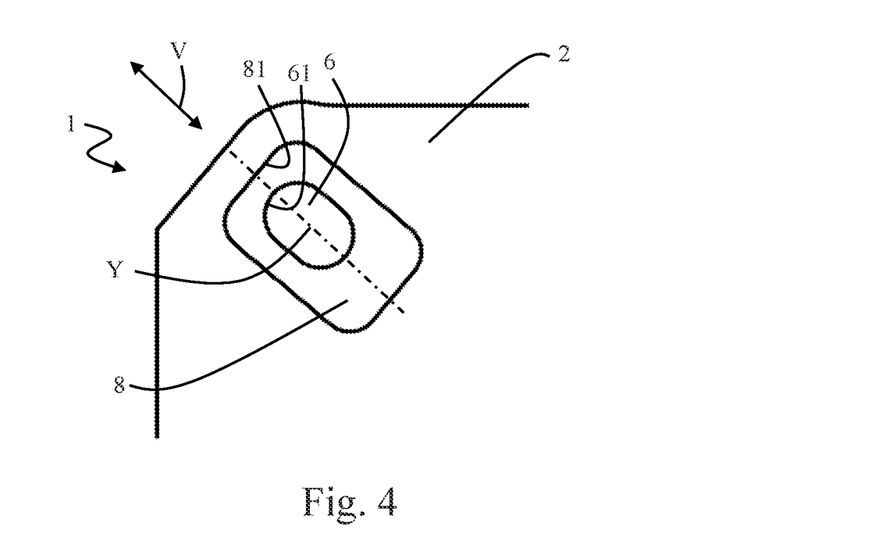
FIG. 4 shows a diagrammatic illustration of the region of the tool carrier on the rear side of the seat.

As can be seen, in particular, in the rear-side illustration of the tool carrier 2 in FIG. 4, a recess 8 is configured in the tool carrier 2 on the rear side of the contact face 30. In the case of the embodiment, the recess 8 is configured as an elongate depression, the longitudinal axis Y of which runs parallel to the longitudinal axis L of the through hole 6.

In the case of the specifically shown exemplary embodiment, the recess 8 is configured, for example, as a depression which is open only on the side which faces away from the contact face 30 and is otherwise enclosed on the circumferential side. Here, for example, the recess 8 can have, in particular, an approximately rectangular cross-sectional shape. In accordance with one modification, however, the recess can also be closed, for example, on the side which faces away from the contact face 30, for example by way of a cover.

Figure 5:
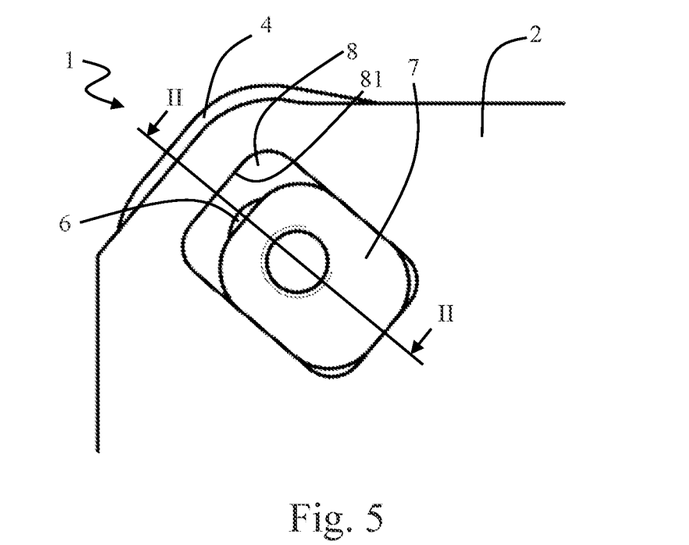
FIG. 5 shows a diagrammatic illustration of the region of the tool carrier on the rear side of the seat with an exchangeable, indexable cutting insert which is received on the seat in a clamping position.
Figure 6:
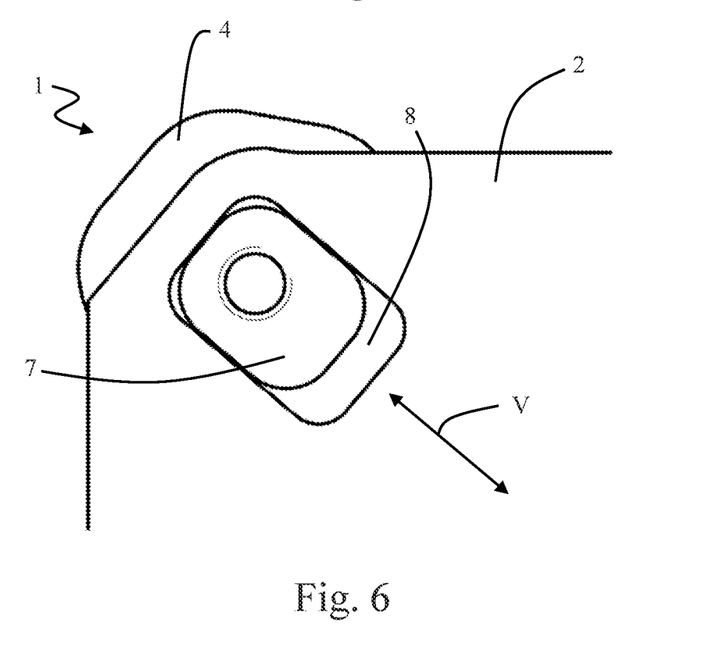
FIG. 6 shows a diagrammatic illustration, corresponding to FIG. 5, with the exchangeable, indexable cutting insert in an indexing position.

A clamping element 7 is arranged in the recess 8, as can be seen, in particular, in FIG. 2, FIG. 5 and FIG. 6. An internal thread 72 which interacts with the external thread 52 of the fastening screw 5 is configured in the clamping element 7. The fastening screw 5 is guided with the shank section 51 through the through hole 46 in the cutting insert 4 and through the through hole 6 in the tool carrier 2, and the external thread 52 of the fastening screw 5 is screwed into the internal thread 72 of the clamping element 7. The head section 50 of the fastening screw 5 is supported on the cutting insert 4. On account of the greater cross section of the head section 50 with respect to the cross section of the through hole 46 of the cutting insert 4, the cutting insert 4 is secured against falling out, even if the fastening screw 5 is not tightened completely. To this end, the through hole 46 of the cutting insert 4 can be provided in the region close to the upper side 43 of the cutting insert 4, in particular, with a shape which is adapted to the lower side of the head section 50.

Here, the clamping element 7 is adapted to the shape of the recess 8 in such a way that it can be displaced along the longitudinal axis Y of the recess, in a direction perpendicularly with respect to the longitudinal axis Y and perpendicularly with respect to the screw axis Z, but is adapted in terms of its width to the width of the recess 8 in such a way that it is held in the recess 8 such that it cannot rotate with regard to rotation about the screw axis Z. In the direction of the longitudinal axis Y of the recess 8, the clamping element 7 is of shorter configuration than the recess 8, in order to make displacing of the clamping element 7 in this direction possible.

If the fastening screw 5 is not tightened, the fastening screw 5 and the clamping element 7 can be displaced jointly in a displacement direction V on account of the described configuration, which displacement direction V runs parallel to the longitudinal axis Y of the recess 8. In the case of the described implementation of the through hole 6 as a slot, the displacement direction V is also parallel here to the longitudinal axis L of the elongate cross-sectional shape of the through hole 6.

In order to make the displacement in the displacement direction V possible, the through hole 6 has to have, at least in the displacement direction V, an extent which is at least greater than the displacement travel than the diameter of the shank section 51 of the fastening screw 5.

In the case of the first embodiment, the possible displacement of the fastening screw 5 and the clamping element 7 in the displacement direction V is limited. In the specifically shown example, a side wall of the recess 8 forms a stop 81 which limits the displacement of the clamping element 7. As an alternative or in addition to this, the displacement can also be limited via a stop 61 which the side wall of the through hole 6 forms for the shank section 51 of the fastening screw 5.

In the case of the embodiment, the displacement direction V has a directional component perpendicularly with respect to the lateral bearing face 31 and also a directional component perpendicularly with respect to the further lateral bearing face 32. The displacement direction V therefore runs neither parallel to the lateral bearing face 31 nor parallel to the further lateral bearing face 32. In the case of the first embodiment, the displacement direction V runs in a section perpendicularly with respect to the screw axis Z, in particular, along the bisector between the lateral bearing face 31 and the further lateral bearing face 32.

In the following text, a method for indexing the cutting insert 4 on the seat 3 of the above-described machining tool 1 will be described in greater detail.

In a clamping position, as is shown, for example, in FIG. 1, FIG. 2, FIG. 5 and FIG. 7, the cutting insert 4 is clamped by way of the fastening screw 5 in the direction of the contact face 30, and bears with one side face 41 against the lateral bearing face 31 and with a further side face 42 against the further lateral bearing face 32. Here, the cutting insert 4 is held on the seat 3 partially in a force-locking manner via the fastening screw 5 and partially in a form-locking manner against rotation about the screw axis Z via the lateral bearing face 31 and the further lateral bearing face 32.

In order to index the cutting insert 4, that is to say in order to move a following cutting edge section 45 of the cutting edge 44 into an active position, the fastening screw 5 is loosened slightly. This can take place, for example, by way of a screwdriver which engages into a corresponding (not shown in greater detail) interface on the head section 50 of the fastening screw 5. The threaded connection between the external thread 52 of the fastening screw 5 and the internal thread 72 of the clamping element 7 is not canceled completely here, but rather the tightening torque is merely loosened. Depending on the specific embodiment of the thread, this can require, for example, only one revolution of the fastening screw 5. Here, the non-rotationally arrangement of the clamping element 7 in the recess 8 prevents the clamping element 7 from likewise rotating about the screw axis Z.

The bracing between the cutting insert 4, the clamping element 7 and that region of the tool carrier 2 which is enclosed between them is released by way of the loosening of the threaded connection. In this state, the fastening screw 5, the clamping element 7 and the cutting insert 4 can be moved jointly in the displacement direction V into the indexing position which is shown diagrammatically in FIG. 6 and FIG. 8. The cutting insert 4 is secured against falling out by the head section 50 of the fastening screw 5. During this displacement, the shank section 51 of the fastening screw 5 moves in the displacement direction V in the through hole 6, and the clamping element 7 moves in the displacement direction V in the recess 8.

Figure 8:
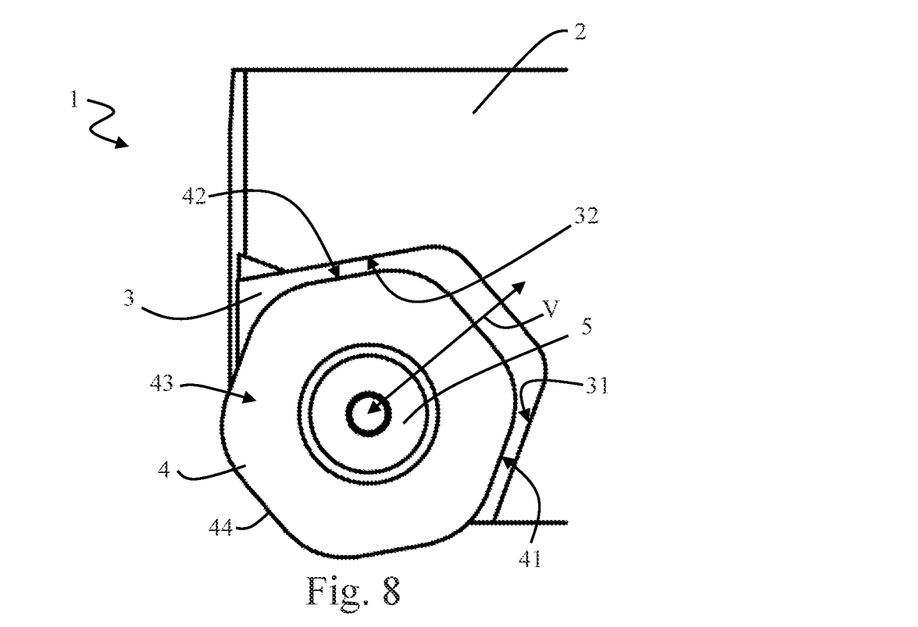
FIG. 8 shows a diagrammatic partial illustration, corresponding to FIG. 7, with the cutting insert in the indexing position.

On account of the mutually adapted shape of the clamping element 7 and the recess 8, the clamping element 7 is guided here in a rail-like manner in the recess 8. As a result of the configuration of the through hole 6 as a slot, the shank section 51 of the fastening screw 5 is also guided in the through hole 6.

Here, the movement in the displacement direction V can take place until it is limited by way of the stop 61 and/or the stop 81. During this movement, the side face 41 of the cutting insert 4 is spaced apart from the lateral bearing face 31, and the further side face 42 of the cutting insert 4 is spaced apart from the further lateral bearing face 32, with the result that the form-locking securing of the cutting insert 4 against rotation about the screw axis Z is canceled.

In the indexing position, the cutting insert 4 can be rotated about the screw axis Z, in order to index it, that is to say in order to move a following cutting edge section 45 into the active machining position. In the case of the specifically shown exemplary embodiment, in the case of which the cutting insert 4 has a substantially hexagonal basic shape with six cutting edge sections 45 which can be used one after another, the cutting insert 4 is therefore rotated, for example, by 60° (=360°/6) or an integral multiple of 60° about the screw axis Z. Here, the angular range which is required for the indexing is defined generally by way of the multiplicity of the rotational symmetry of the cutting insert 4 about the screw axis Z.

Figure 7:
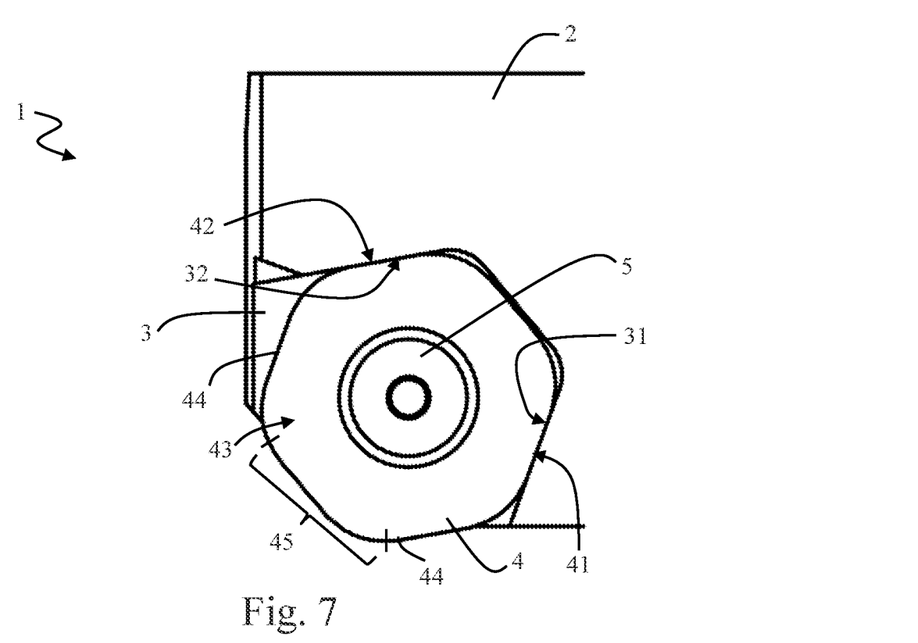
FIG. 7 shows a diagrammatic partial illustration of the seat in a plan view with an exchangeable, indexable cutting insert received thereon in the clamping position.

After the indexing by way of rotation of the cutting insert 4 by the predefined angular range, the fastening screw 5, the cutting insert 4 and the clamping element 7 are again jointly moved into the clamping position which is shown in FIG. 5 and FIG. 7 and in which one side face 41 (a different one to previously) bears against the lateral bearing face 31 and a further side face 42 (a different one than previously) bears against the further lateral bearing face 32. In this position, the cutting insert 4 is again secured in a form-locking manner against rotation about the screw axis Z.

By way of subsequent tightening of the threaded connection between the fastening screw 5 and the clamping element 7, the cutting insert 4 is again clamped fixedly on the seat 3, with the result that it can no longer be displaced jointly with the fastening screw 5 and the clamping element 7. Here, the non-rotationally arrangement of the clamping element 7 and the recess 8 prevents the clamping element from corotating during tightening of the fastening screw 5.

Second Embodiment

A second embodiment of the machining tool will be described briefly in the following text with reference to FIG. 9 and FIG. 10. Here, in order to avoid repetition, only the differences from the above-described first embodiment will be explained, and the same designations as in the case of the first embodiment will be used.

The machining tool 1' in accordance with the second embodiment is a rotary holder for turning, in the case of which the tool carrier 2 has only one seat 3 for receiving an exchangeable, indexable cutting insert 4. Here, in the case of the second embodiment, the tool carrier 2 which is shown by way of example is configured, in particular, as what is known as a monoblock rotary holder.

In a further difference from the above-described first embodiment, the cutting insert 4 in the case of the second embodiment is supported, furthermore, indirectly via a washer 9 which is arranged in between on the contact face of the seat 3.

The further features of the seat 3 and also of the above-described mechanism for indexing the cutting insert 4 are identical to those of the above-described first embodiment, and therefore will not be repeated.

Figure 9:
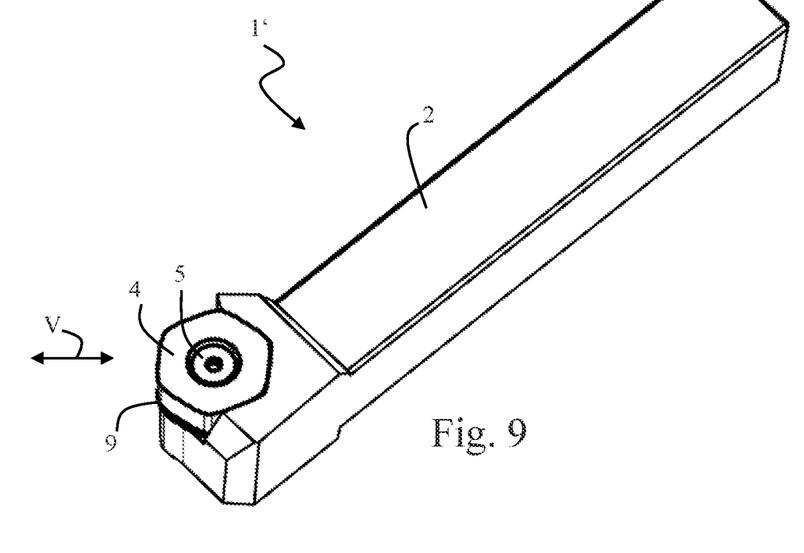
FIG. 9 shows a diagrammatic perspective illustration of a machining tool in accordance with a second embodiment with an exchangeable, indexable cutting insert held thereon in a clamping position.
Figure 10:
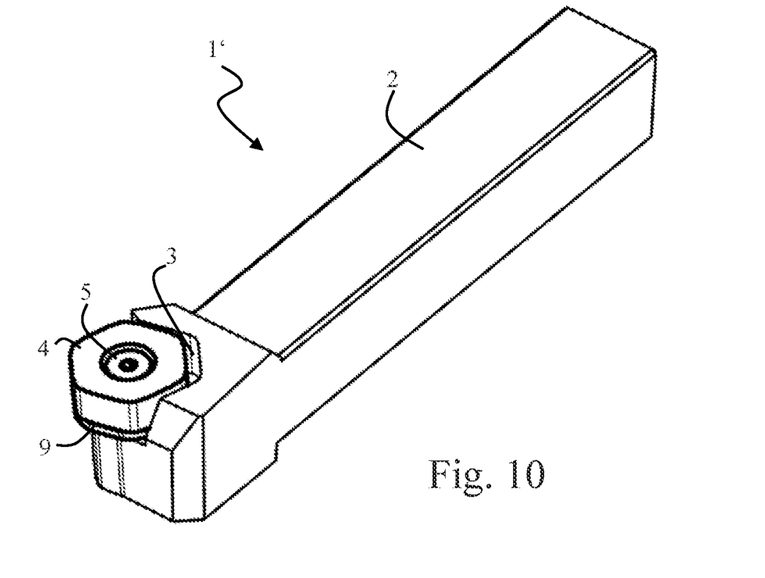
FIG. 10 shows a diagrammatic perspective illustration of the machining tool in accordance with the second embodiment with the cutting insert in an indexing position.

FIG. 9 shows the machining tool 1' in accordance with the second embodiment in a state, in which the cutting insert 4 is held in a clamping position. FIG. 10 shows the machining tool 1' in a state, in which the cutting insert 4 is situated in the indexing position.

Modifications

Although, in the case of the above-described embodiments, an embodiment of the through hole 6 as a slot which is particularly advantageous was described in each case, the through hole can also have, for example, a different cross-sectional shape, and the displacement direction can be defined, for example, only via the guidance of the clamping element 7 in the recess 8. It is to be noted, however, that the through hole 6 has to have a sufficient oversize in comparison with the shank section 51 of the fastening screw 5, in order that a sufficient displacement is made possible.

Although the exemplary embodiments of the machining tool have described by way of example a bar peeling cartridge for bar peeling and a monoblock holder for turning, the machining tool can also have a different configuration. For example, the application is not necessarily restricted to turning, but rather machining tools for other machining applications are also conceivable. In particular in the case of machining tools for turning, the described mechanism is particularly suitable for indexing cutting inserts, however.

Figure 11:
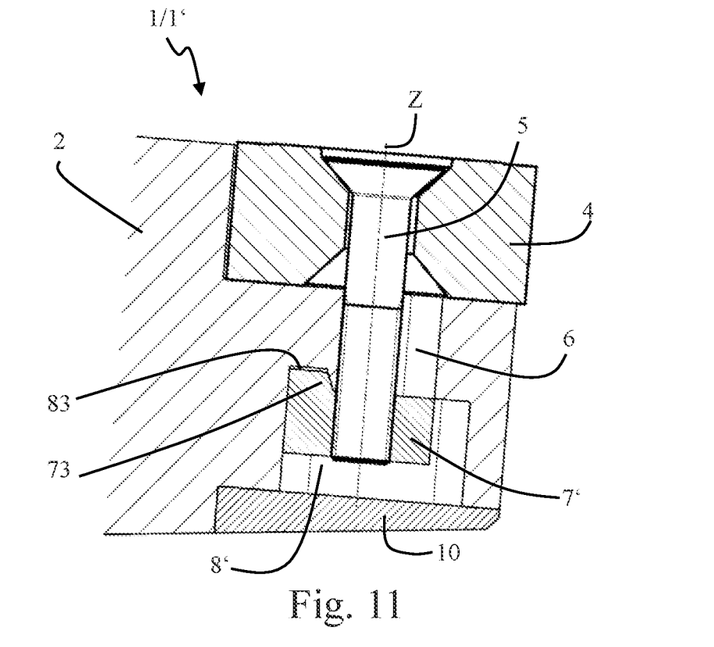
FIG. 11 shows a diagrammatic sectional illustration in the region of the seat in the case of one modification in a clamping position.
Figure 12:
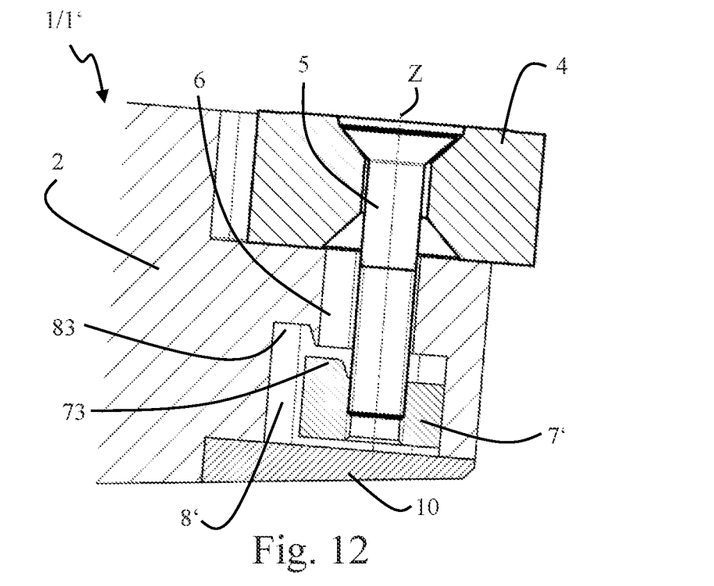
FIG. 12 shows a diagrammatic sectional illustration in the region of the seat in the case of the modification in an indexing position.

One modification of the embodiment of the machining tool in the region of the seat will be described briefly in the following text with reference to FIG. 11 and FIG. 12. Here, the modification can be used in combination with the above-described exemplary embodiments and modifications. The modification which is shown in FIG. 11 and FIG. 12 differs from the above-described embodiments in that i) the cutting insert 4 is configured as a double-sided cutting insert, ii) the recess 8' and the clamping element 7' are also configured for securing the cutting insert 4 in the clamping position with a form-locking component, and iii) the recess 8' is also closed on the rear side by way of a cover 10. It is to be noted, however, that these differences i), ii) and iii) can also be used in each case individually or in any desired combination.

The cover 10 closes the recess 8' on the rear side, with the result that the penetration of dirt is prevented. Furthermore, the cover 10 prevents that the clamping element 7' falls out or is lost in the case of a complete removal of the fastening screw 5.

As can be seen in FIG. 11 and FIG. 12, the recess 8' has an additional ramp-shaped depression 83 which is configured to interact with a lug-like projection 73 of the clamping element 7'. Here, the depression 83 and the projection 73 interact in accordance with the principle of an inclined plane in such a way that, during tightening of the fastening screw 5, the cutting insert 4, the fastening screw 5 and the clamping element 7' are jointly tensioned in the region of the clamping position, as can be seen in FIG. 11. Here, the interaction between the projection 73 and the depression 83 brings about additional form-locking securing in the clamping position, with the result that the fixing in the clamping position takes place not only by way of surface pressure and friction, as is the case in the above-described implementation.

Figure 13:
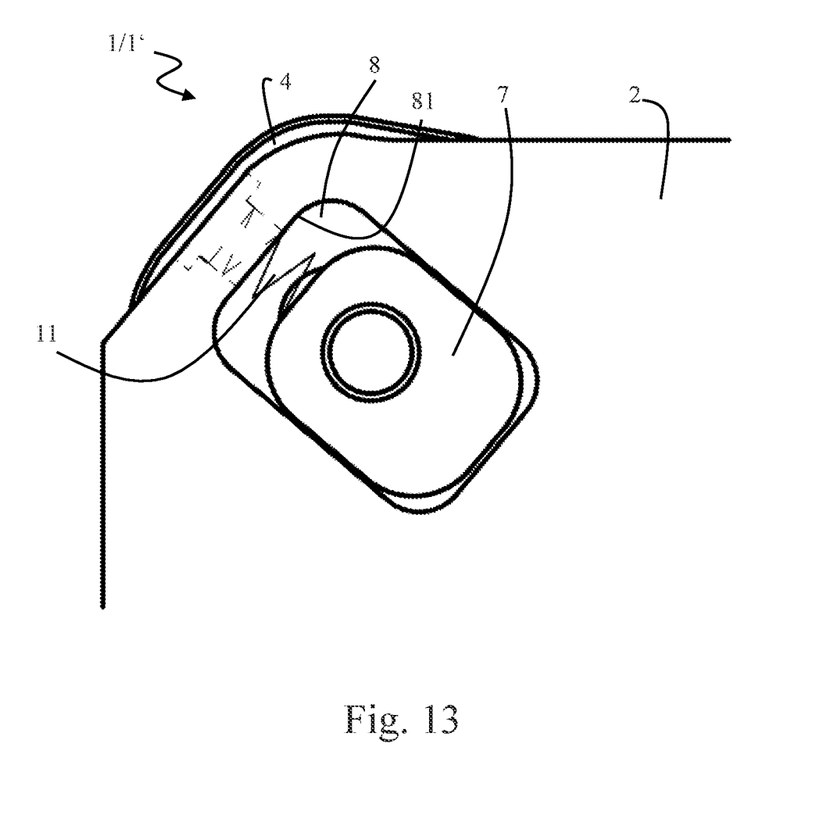
FIG. 13 shows a diagrammatic illustration of the region of the tool carrier on the rear side of the seat in the case of a further modification.

In the case of a further modification which is shown diagrammatically in FIG. 13, a spring element 11 is additionally provided in this way, which spring element 11 prestresses the clamping element 7 and therefore indirectly also the fastening screw 5 and the cutting insert 4 in the direction of the clamping position. Particularly comfortable indexing is made possible in this way. Although a helical spring is shown diagrammatically as spring element 11 by way of example in FIG. 13, spring elements of different configuration which bring about a prestress in the direction of the clamping position can also be used.

It is to be noted that this further modification can also be used in the case of the two above-described exemplary embodiments and also in combination with the above-specified modifications.

Figure 14:
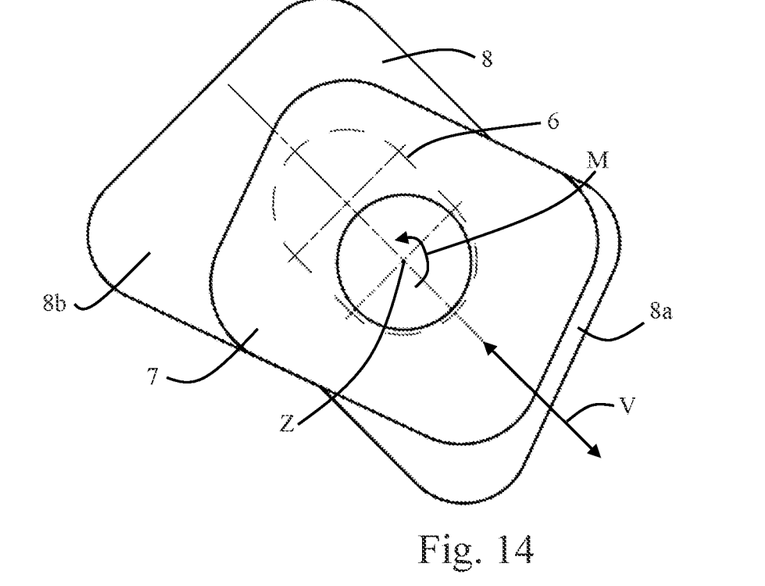
FIG. 14 shows a diagrammatic illustration of the region of the tool carrier on the rear side of the seat in yet another modification in a clamping position.
Figure 15:
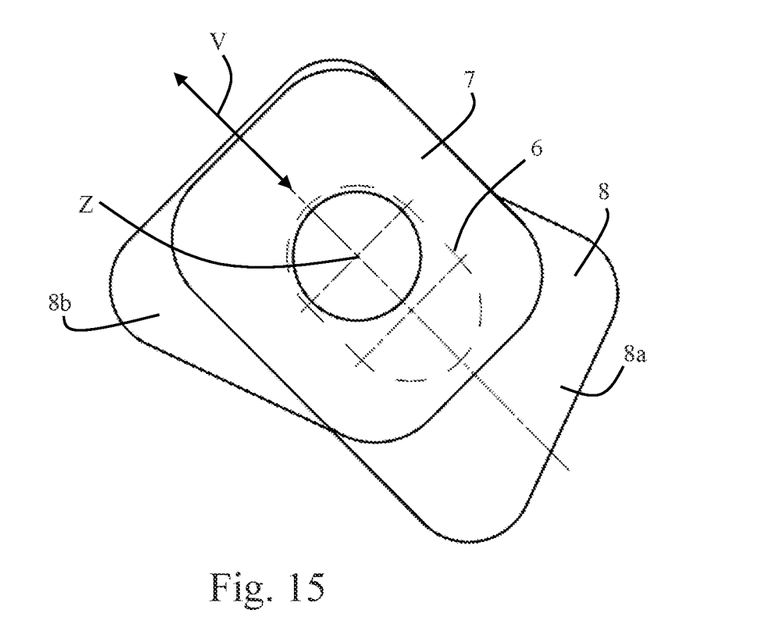
FIG. 15 shows a diagrammatic illustration of the modification from FIG. 14 in an indexing position.

A further modification, in the case of which additional form-locking securing is provided in the clamping position, will be explained briefly in the following text with reference to the diagrammatic illustrations of FIG. 14 and FIG. 15. The further modification differs from the above-described embodiments in that the recess 8 does not have a substantially rectangular basic shape in cross section, but rather has a clamping section 8a and an indexing section 8b which is turned somewhat with regard to the screw axis Z.

The functionality of this further modification will now briefly be explained in greater detail. When the clamping element 7 is in the indexing position which is shown in FIG. 15, the cutting insert (not shown in FIG. 14 and FIG. 15) can be indexed, as has been described above with regard to the embodiments. Furthermore, the clamping element 7, the fastening screw 5 and the cutting insert 4 can also be displaced in the displacement direction V in this position, as has already been described above for the embodiment. If the clamping element 7 is moved jointly with the fastening screw 5 and the cutting insert 4 along the displacement direction V into the clamping position which is shown in FIG. 15, the clamping element 7 is first of all guided in the displacement direction V by way of the side walls of the recess 8 until the cutting insert 4 bears against the lateral bearing face 31 and the further lateral bearing face 32, as has been described above. In the case of tightening of the fastening screw 5, the latter exerts a torque M on the clamping element 7, as is illustrated in FIG. 14 diagrammatically by way of an arrow. As a result of the embodiment of the clamping section 8a which is arranged slightly turned with respect to the indexing section 8b with regard to the screw axis Z, the clamping element 7 turns slightly about the screw axis Z into the clamping position which is shown in FIG. 14 on account of the torque which is exerted by way of the fastening screw 5. On account of the turning, the clamping element 7 is then secured in a form-locking manner against a displacement in the displacement direction V by way of the side walls of the clamping section 8a. As a consequence, in addition to the force-locking fastening via the fastening screw 5, the cutting insert 4 is also secured in the clamping position in a form-locking manner.

This further modification can also be combined as desired with the above-described embodiments and modifications.

The invention claimed is:

1. A machining tool, comprising:
a tool carrier having at least one seat for receiving an exchangeable, indexable cutting insert having a through hole formed therein;
a fastening screw for fastening the cutting insert to said seat, said fastening screw having a head section to be supported on the cutting insert and a shank section having an external thread at least in some regions;
the through hole in the cutting insert having a smaller cross section than said head section of said fastening screw;
said seat having a contact face for supporting an underside of the cutting insert, and said seat having at least one lateral bearing face for supporting a side face of the cutting insert, and said seat having at least one further lateral bearing face for supporting a further side face of the cutting insert;
said contact face having a through hole formed therein for permitting said shank section of said fastening screw to reach through said through hole;
a clamping element disposed on said tool carrier on a rear side of said contact face of said seat, said clamping element having an internal thread interacting with said external thread of said fastening screw; and
said fastening screw and said clamping element being displaceable jointly in a displacement direction, said displacement direction having a directional component perpendicular to said lateral bearing face, and said displacement direction having a directional component perpendicular to said at least one further lateral bearing face.

2. The machining tool according to claim 1, wherein said tool carrier has a stop limiting a displacement of said fastening screw and said clamping element in said displacement direction.

3. The machining tool according to claim 1, wherein said lateral bearing face and said further lateral bearing face enclose a seat-side interior angle ($\alpha$)<90° as viewed perpendicularly to said contact face.

4. The machining tool according to claim 1, wherein said through hole is configured as a slot with an elongate cross-sectional shape and a longitudinal axis of said elongate cross-sectional shape running in said displacement direction.

5. The machining tool according to claim 1, wherein said clamping element is received in a rear-side recess of said tool carrier.

6. The machining tool according to claim 5, wherein said clamping element is held in said recess in a manner preventing rotation and permitting displacement in said displacement direction.

7. The machining tool according to claim 1, wherein the machining tool is a bar peeling cartridge for bar peeling.

8. The machining tool according to claim 7, wherein said machining tool has at least one other seat for receiving exchangeable cutting inserts.

9. A machining assembly, comprising the machining tool according to claim 1, and an exchangeable, indexable cutting insert disposed on said seat.

* * * * *